(12) United States Patent
Zhao

(10) Patent No.: US 11,686,976 B2
(45) Date of Patent: Jun. 27, 2023

(54) PHASE DELAY DEVICE COMPRISING A LIQUID CRYSTAL LAYER HAVING A SPIRAL STRUCTURE, PREPARATION METHOD, AND DISPLAY DEVICE

(71) Applicant: Beijing Rayboch Technology Co., Ltd., Beijing (CN)

(72) Inventor: Wenqing Zhao, Beijing (CN)

(73) Assignee: Beijing Rayboch Technology Co., Ltd., Beijing (CN)

( * ) Notice: Subject to any disclaimer, the term of this patent is extended or adjusted under 35 U.S.C. 154(b) by 0 days.

(21) Appl. No.: 18/077,156

(22) Filed: Dec. 7, 2022

(65) Prior Publication Data

US 2023/0093916 A1  Mar. 30, 2023

Related U.S. Application Data

(63) Continuation of application No. PCT/CN2021/137386, filed on Dec. 13, 2021.

(30) Foreign Application Priority Data

Feb. 7, 2021  (CN) .......................... 202110168992.9

(51) Int. Cl.
*G02F 1/13363* (2006.01)
*G02F 1/1337* (2006.01)
*G02F 1/1335* (2006.01)

(52) U.S. Cl.
CPC ........ *G02F 1/13363* (2013.01); *G02F 1/1337* (2013.01); *G02F 1/133531* (2021.01)

(58) Field of Classification Search
CPC ........... G02F 1/133531; G02F 2413/08; G02F 1/133761
See application file for complete search history.

(56) References Cited

U.S. PATENT DOCUMENTS

| | | | |
|---|---|---|---|
| 2001/0003473 A1 | 6/2001 | Galabova et al. | |
| 2010/0271575 A1 | 10/2010 | Ojima et al. | |
| 2017/0075171 A1* | 3/2017 | Lee ...................... | G02B 5/3041 |

(Continued)

FOREIGN PATENT DOCUMENTS

| | | |
|---|---|---|
| CN | 1281999 A | 1/2001 |
| CN | 101542331 A | 9/2009 |

(Continued)

*Primary Examiner* — Paul C Lee
(74) *Attorney, Agent, or Firm* — NZ Carr Law Office

(57) ABSTRACT

A phase delay device, its preparation method and a display equipment are provided. The phase delay device includes linear polarization layer, alignment layer and liquid crystal layer. The linear polarization layer is configured to convert received light into a linear polarization light; the alignment layer is configured to align liquid crystals of a first subpart of the liquid crystal layer based on a preset alignment angle; the liquid crystal layer is located at a side of the alignment layer away from the linear polarization layer, and includes a first subpart adjacent to the alignment layer, a second subpart having a spiral structure with a preset spiral angle and a third subpart; a liquid crystal alignment angle of the third subpart is determined based on the preset alignment angle and the preset spiral angle; birefringence of the liquid crystal layer does not decrease with an increase of visible light wavelength.

8 Claims, 6 Drawing Sheets

(56) References Cited

U.S. PATENT DOCUMENTS

| | | | |
|---|---|---|---|
| 2019/0278152 A1* | 9/2019 | Wang | ........................ G02F 1/29 |
| 2020/0132904 A1 | 4/2020 | Smith et al. | |
| 2021/0132275 A1* | 5/2021 | Beon | ................. G02F 1/133531 |
| 2021/0208433 A1* | 7/2021 | Ahn | ...................... G02F 1/1368 |

FOREIGN PATENT DOCUMENTS

| | | | | |
|---|---|---|---|---|
| CN | 107111044 A | | 8/2017 | |
| CN | 110058345 A | | 7/2019 | |
| CN | 112230478 A | * | 1/2021 | ......... G02F 1/13363 |
| CN | 112230478 A | | 1/2021 | |
| CN | 112505820 A | | 3/2021 | |
| JP | 2007333945 A | | 12/2007 | |

\* cited by examiner

PHASE DELAY DEVICE COMPRISING A LIQUID CRYSTAL LAYER HAVING A SPIRAL STRUCTURE, PREPARATION METHOD, AND DISPLAY DEVICE

TECHNICAL FIELD

This specification relates to a field of display technology, especially to a phase delay device, its preparation method and display equipment.

BACKGROUND

With the rapid development of the Organic Light Emitting Diode (OLED) technology, OLED display panel is used in more and more electronic devices such as mobile phones, tablet computers. In the OLED display panel, in order to solve the contrast problem caused by the reflection of natural light on the metal inside the OLED display panel, a phase delay device (such as circular polarizer) is used in the OLED display to control this reflection.

Circular polarizer may be composed of a linear polarizer and two superposed wave plates, the two superposed wave plates may be respectively a half wave plate and a quarter wave plate. As the circular polarizer needs to have a performance of wide range band, an angle between an optical axis of the quarter wave plate and a polarization axis of the linear polarizer, is different from an angle between an optical axis of the half wave plate and the polarization axis of the linear polarizer.

Therefore, in the preparation of circular polarizer, it is necessary to conduct one alignment for each of the half wave plate and the quarter wave plate respectively based on different alignment angles (that is, at least two alignment times are needed). Due to the high complexity of the alignment process, multiple alignments would lead to low preparation efficiency of the phase delay device and poor benign ratio of the device.

SUMMARY

The purpose of the disclosure is to provide a phase delay device, its preparation method and display equipment, which aim to solve the problem of low preparation efficiency and poor benign rate in the preparation of the phase delay device.

To solve the above problems, embodiments of this specification are realized as follows:

In a first aspect, an embodiment of the disclosure provides a phase delay device, including a linear polarization layer, an alignment layer and a liquid crystal layer; the linear polarization layer being located at a side of a light source, and configured to convert a received light to a linear polarization light; the alignment layer being located at a side of the linear polarization layer away from the light source, and configured to align liquid crystals of a first subpart of the liquid crystal layer based on a preset alignment angle; the liquid crystal layer being located at a side of the alignment layer away from the linear polarization layer, the liquid crystal layer including a first subpart, a second subpart and a third subpart, the first subpart being adjacent to the alignment layer, and the second subpart being a spiral structure with a preset spiral angle, a liquid crystal alignment angle of the third subpart being determined based on the preset alignment angle and the preset spiral angle, the liquid crystal layer being configured to convert the linear polarization light into circular polarization light through the spiral structure of the second subpart; the liquid crystal layer being a liquid crystal layer including negative distribution liquid crystals, and birefringence of the liquid crystal layer not decreasing with an increase of visible light wavelength; the spiral angle of the second subpart and a target delay of the liquid crystal layer being determined based on the alignment angle for the first subpart and a wavelength of light at a preset band.

Optionally, the preset band includes various different visible light bands, and the target delay includes a first delay corresponding to the preset band.

Optionally, a ratio of a wavelength of light in respective visible light band contained in the preset band to a corresponding first delay is in a preset ratio range.

Optionally, the negative distribution liquid crystals are reactive polymer liquid crystals with negative distribution.

Optionally, the phase delay device further includes a refractive film layer adjacent to the third subpart of the liquid crystal layer, a delay of the refractive film layer is determined based on the target delay of the liquid crystal layer, and the refractive film layer is configured to adjust a viewing angle corresponding to the circular polarization light.

Optionally, a refractive index of the refractive film layer satisfies NZ>NX=NY, where, NX is a refractive index of the refractive film layer in a lagging phase axis direction, NY is a refractive index of the refractive film layer in a leading phase axis direction, NZ is a refractive index of the refractive film layer in a thickness direction.

Optionally, a thickness of the liquid crystal layer is determined based on the birefringence and the target delay of the liquid crystal layer in the preset band.

In a second aspect, an embodiment of the disclosure provides a display equipment, which includes the phase delay device according to the above first aspect.

In a third aspect, an embodiment of the disclosure provides a preparation method of phase delay device, which is suitable for the display equipment according to the second aspect. The method includes:

at an alignment layer, aligning liquid crystals of a first subpart of a liquid crystal layer based on a preset alignment angle;

determining, based on a preset parameter determination method, a spiral angle of a second subpart of the liquid crystal layer and a target delay of the liquid crystal layer in the preset band corresponding to the preset alignment angle and a wavelength of light in a preset band, so that a linear polarization light is converted to a circular polarization light satisfying light conversion requirements for the preset band under the action of the liquid crystal layer.

Optionally, determining, based on a preset parameter determination method, a spiral angle of a second subpart of the liquid crystal layer and a target delay of the liquid crystal layer in the preset band corresponding to the preset alignment angle and a wavelength of light in a preset band, includes:

determining a spiral angle of the second subpart of the liquid crystal layer corresponding to the preset alignment angle based on a preset spiral angle determination method;

determining through a preset delay determination method, the target delay of the liquid crystal layer in the preset band based on the preset alignment angle, the spiral angle and the wavelength of light in the preset band.

In a fourth aspect, embodiments of the disclosure provide an electronic device, including a processor, a storage and a computer program stored on the storage and executable by the processor, steps of the preparation method of the phase delay device provided in the above mentioned embodiment being implemented when the computer program is executed by the processor.

In a fifth aspect, the embodiments of the disclosure provides a computer readable storage medium storing a computer program thereon, the preparation method of the phase delay device provided by the embodiment being realized when the computer program is executed by the processor.

As can be seen from the above technical solutions provided by the embodiments of the specification, embodiments of the disclosure provides a phase delay device, its preparation method, and display equipment. The phase delay device includes a linear polarization layer, an alignment layer and a liquid crystal layer; the linear polarization layer being located at a side of a light source, and configured to convert a received light to a linear polarization light; the alignment layer being located at a side of the linear polarization layer away from the light source, and configured to align liquid crystals of a first subpart of the liquid crystal layer based on a preset alignment angle; the liquid crystal layer being located at a side of the alignment layer away from the linear polarization layer, the liquid crystal layer including a first subpart, a second subpart and a third subpart, the first subpart being adjacent to the alignment layer, and the second subpart being a spiral structure with a preset spiral angle, a liquid crystal alignment angle of the third subpart being determined based on the preset alignment angle and the preset spiral angle, the liquid crystal layer being configured to convert the linear polarization light into circular polarization light through the spiral structure of the second subpart; the liquid crystal layer being a liquid crystal layer including negative distribution liquid crystals, and birefringence of the liquid crystal layer not decreasing with an increase of visible light wavelength; the spiral angle of the second subpart and a target delay of the liquid crystal layer being determined based on the alignment angle for the first subpart and a wavelength of light at a preset band. In such manners, performances of the phase delay device under the preset band can be improved under the action of the preset alignment angle of the first subpart of the liquid crystal layer, the spiral angle of the second subpart and the target delay of the liquid crystal layer, such that the phase delay device operates well under the wide band. Meanwhile, by means of a single alignment of the first subpart of the liquid crystal layer, the linear polarization light can be converted to circular polarization light via the spiral structure of the second subpart of the liquid crystal layer, which reduces the number of alignment operations. That is to say, the problem of low preparation efficiency caused by multiple alignments can be avoided, and the benign rate of the device can also be improved.

BRIEF DESCRIPTION OF THE DRAWINGS

In order to explain the embodiments of this specification or schemes of prior art more clearly, drawings used to describe the embodiments or the prior art will be introduced briefly in the following. It is obvious that the drawings in the following description is just some embodiments recorded in this specification. For those of ordinary skill in the art, other drawings can be obtained based on these drawings without paying creative labor.

FIG. 5 (*b*) is a second structural schematic diagram of the display equipment provided by an embodiment of the specification.

DETAILED DESCRIPTION

The embodiment of the specification provides a phase delay device, its preparation method and a display equipment.

In order to better understanding of technical schemes in the embodiment of this specification by those skilled in the art, the technical schemes in the embodiment of this specification will be clearly and completely described below in combination with the accompanying drawings in the embodiment of this specification. Obviously, the described embodiments are just some embodiments of the specification, rather than all of the embodiments. All of other embodiments obtained by those of ordinary skill in the art based on the embodiments in this specification without paying creative labor should belong to the protective scope of the specification.

Embodiment One

Figure 1:
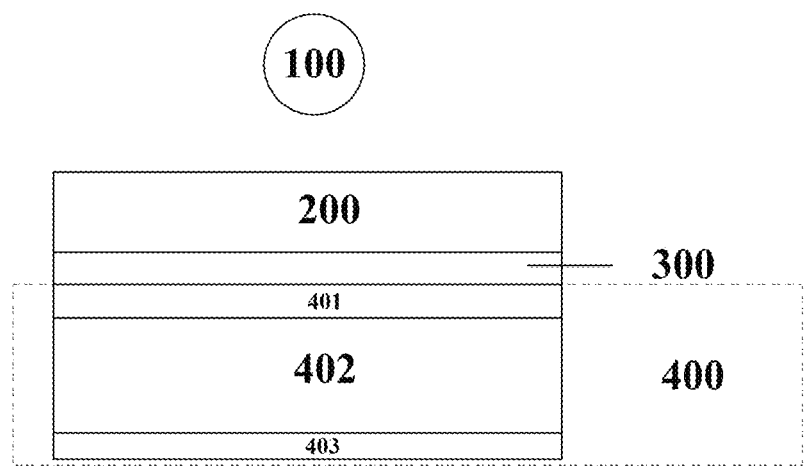
FIG. 1 is a first structural schematic diagram of the phase delay device provided by an embodiment of the specification.

FIG. 1 is a first structural schematic diagram of the phase delay device provided by the embodiment of this specification. The phase delay device includes: a linear polarization layer 200, an alignment layer 300 and a liquid crystal layer 400;

The linear polarization layer 200 is located at a side of a light source 100, and is configured to convert a received light to a linear polarization light. The light source 100 may be any light source which can emit natural light, and the linear polarization layer 200 may include any device that can convert the natural light emitted by the light source into linear polarization light, such as linear polarizer, line grid polarizer, etc.

The alignment layer 300 is located at a side of the linear polarization layer away from the light source, and is configured to align liquid crystals of a first subpart 401 of the liquid crystal layer 400 based on a preset alignment angle.

Figure 2:
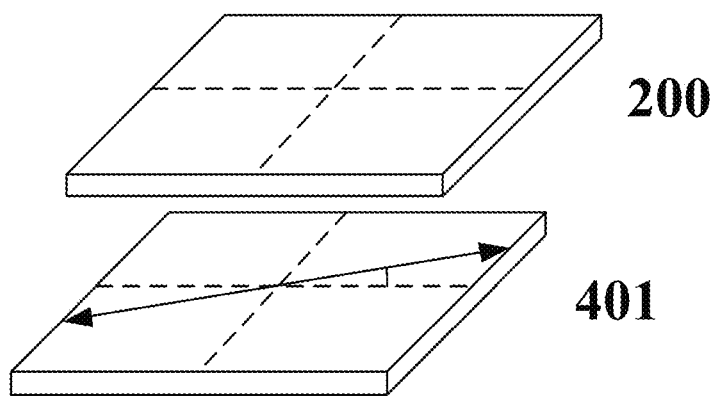
FIG. 2 is a second structural schematic diagram of the phase delay device provided by an embodiment of the specification.

As shown in FIG. 2, the preset alignment angle may be an included angle between an arrangement direction of liquid crystals of a first subpart 401 of the liquid crystal layer 400 and a polarization axis of the linear polarization layer 200. The preset alignment angle may be any alignment angle within the preset angle range. For example, the preset angle range may be 0°~45°, and the preset alignment angle may be 0°. In other words, the alignment layer 300 may align the liquid crystals of the first subpart 401 of the liquid crystal layer 400 based on 0°, so that an included angle between the optical axis of the first subpart 401 of the liquid crystal layer 400 and the polarization axis of the linear polarization layer 200 is 0°.

Where, when carrying out the alignment via the alignment layer 300, an optical alignment mode may be adopted. In addition, such alignment modes like friction alignment mode may also be adopted, the adopted alignment mode is varied according to the change of the actual application scenarios. The alignment process of the alignment layer 300 is not specifically limited in the embodiments of the disclosure.

Since liquid crystals of the first subpart 401 of the liquid crystal layer 400 is aligned based on the preset alignment angle at the alignment layer 300, the liquid crystals of the first subpart 401 of the liquid crystal layer 400 will be arranged in a direction corresponding to the preset alignment angle after coating. After preparing the alignment layer, the liquid crystal layer 400 may be coated, and then the first subpart 401 of the liquid crystal layer 400 may be cured using UV light curing.

The liquid crystal layer 400 may be located on one side of the alignment layer 300 which is away from the linear polarization layer 200, and the liquid crystal layer 400 may include the first subpart 401, the second subpart 402, and the third subpart 403. As shown in FIG. 1, the first subpart 401 may be the top of the liquid crystal layer 400, the second subpart 402 may be the interior of the liquid crystal layer 400, and the third subpart 403 may be the bottom of the liquid crystal layer 400.

The first subpart 401 is adjacent to the alignment layer 300, and the second subpart 402 has a spiral structure with a preset spiral angle. A liquid crystal alignment angle in the third subpart 403 is determined by the preset alignment angle and the preset spiral angle. The liquid crystal layer 400 is configured to convert linear polarization light to circular polarization light through the spiral structure of the second subpart 402. Where, the preset spiral angle of the second subpart 402 may match with the preset alignment angle of the first subpart 401 in terms of plus-minus sign. In addition, in order to achieve the spiral structure of the second subpart 402, chiral agent may be added to nematic liquid crystal. Moreover, there are a variety of implementations, which are not limited in the embodiment of the disclosure.

For example, the preset alignment angle of the first subpart 401 may be any angle from 0° to 45°, and the preset spiral angle of the second subpart 402 may be any angle from 0° to 70°. If the preset alignment angle of the first subpart 401 is 30°, the preset spiral angle of the second subpart 402 may be 23°. A corresponding liquid crystal alignment angle of the third subpart 403 may be 53°.

The spiral angle of the second subpart and a target delay of the liquid crystal layer may be determined based on the alignment angle of the first subpart and the wavelength of light in the preset band. For example, after determining the preset alignment angle of the first subpart 401, a preset spiral angle of the second subpart 402 may be determined based on the preset alignment angle. After determining the preset spiral angle, a target delay of the liquid crystal layer 400 may be determined based on the preset alignment angle of the first subpart 401, the preset spiral angle of the second subpart 402 and the wavelength of the light under the preset band. That is, the target delay of the liquid crystal layer 400 may be determined based on the alignment angle of the first subpart 401, the spiral angle of the second subpart 402, and the wavelength of the light under the preset band.

For example, the preset alignment angle of the first subpart 401 may be any angle from 25° to 35°, and the preset spiral angle of the second subpart 402 may be any angle from 20° to 25°, and the preset band may be a band of 550 nm. The target delay may be any delay between 135 nm-150 nm or between 140 nm-145 nm. For example, the preset alignment angle of the first subpart 401 may be 30°, the preset spiral angle of the second subpart 402 may be 23°, and the liquid crystal alignment angle of the third subpart 403 may be 53°. The target delay may be 140 nm.

Alternatively, the preset alignment angle of the first subpart 401 may be any angle from 5° to 15°, the preset spiral angle of the second subpart 402 may be any angle from 45° to 55°, and the preset band may be a band of 550 nm. The target delay may be any delay from 150 nm to 180 nm or from 165 nm to 170 nm. For example, the preset alignment angle of the first subpart 401 may be 10°, the preset spiral angle of the second subpart 402 may be 52°, and the liquid crystal alignment angle of the third subpart 403 may be 62°. The target delay may be 165 nm.

Alternatively, the preset alignment angle of the first subpart 401 may be any angle from 0° to 5°, and the preset spiral angle of the second subpart 402 may be any angle from 60° to 65°, and the preset band may be 550 nm. The target delay may be any delay from 180 nm to 200 nm or from 190 nm to 198 nm. For example, the preset alignment angle of the first subpart 401 may be 0°. The preset spiral angle for the second subpart 402 may be 63°, the liquid crystal alignment angle of the third subpart 403 may be 63°, and the target delay may be 190 nm.

The liquid crystal layer 400 may be a liquid crystal layer including a negative distribution liquid crystal. The birefringence of the liquid crystal layer 400 does not decrease with an increase of the wavelength of visible light, or the birefringence difference of the liquid crystal layer 400 (that is, the birefringence difference between a fast axis and a slow axis of the negative distribution liquid crystal) does not decrease with an increase of the wavelength of the visible light.

The natural light, after emitted by the light source, may be converted into linear polarization light via the linear polarization layer 200, and the linear polarization light may be converted into circular polarization light under the action of the liquid crystal layer 400. Namely, in a bangka ball, a light state of the linear polarization light may be converted from an equator position of the bangka ball directly to a pole position of the bangka ball. That is, the linear polarization light may be directly transformed into circular polarization light. In addition, since the target delay of the liquid crystal layer 400 is determined based on the preset alignment angle of the first subpart 401 of the liquid crystal layer, the spiral angle of the second subpart 402, and the wavelength of light under the preset band, a ratio of the target delay of the liquid crystal layer 400 to the wavelength of the light under the preset band may reach a preset target constant value (e.g., a quarter). That is, a wide-band effect of the phase delay device can be guaranteed under the action of liquid crystal layer 400, i.e., the wide-band effect can be realized through a single alignment operation, and the preparation efficiency and benign rate of the phase delay device can be improved.

Embodiments of the disclosure provides a phase delay device. The phase delay device includes a linear polarization layer, an alignment layer and a liquid crystal layer; the linear polarization layer being located at a side of a light source, and configured to convert a received light to a linear polarization light; the alignment layer being located at a side of the linear polarization layer away from the light source, and configured to align liquid crystals of a first subpart of the liquid crystal layer based on a preset alignment angle; the liquid crystal layer being located at a side of the alignment layer away from the linear polarization layer, the liquid crystal layer including a first subpart, a second subpart and a third subpart, the first subpart being adjacent to the alignment layer, and the second subpart being a spiral structure with a preset spiral angle, a liquid crystal alignment angle of the third subpart being determined based on the preset alignment angle and the preset spiral angle, the liquid crystal layer being configured to convert the linear polarization light into circular polarization light through the spiral structure of the second subpart; the liquid crystal layer being a liquid crystal layer including negative distribution liquid crystals, and birefringence of the liquid crystal layer not decreasing with an increase of visible light wavelength; the spiral angle of the second subpart and a target delay of the liquid crystal layer being determined based on the alignment angle for the first subpart and a wavelength of light at a preset band. In such manners, performances of the phase delay device under the preset band can be improved under the action of the preset alignment angle of the first subpart of the liquid crystal layer, the spiral angle of the second subpart and the target delay of the liquid crystal layer, such that the phase delay device operates well under the wide band. Meanwhile, by means of a single alignment of the first subpart of the liquid crystal layer, the linear polarization light can be converted to circular polarization light via the spiral structure of the second subpart of the liquid crystal layer, which reduces the number of alignment operations. That is to say, the problem of low preparation efficiency caused by multiple alignments can be avoided, and the benign rate of the device can also be improved.

Embodiment Two

An embodiment of the disclosure provides another phase delay device. The phase delay device includes all the functional units of the phase delay device in embodiment one above, and improvements are made on this basis. Improvements are as follows:

The preset band contains a plurality of different visible light bands, for example, the preset band may include any number of bands within 380 nm~780 nm. Target delay includes a first delay corresponding to a respective preset band, and a ratio of a wavelength of the light in visible light band contained in the preset band to a corresponding first delay is in a preset ratio range.

For example, the preset band may include green light band, blue light band and red light band, and the target delay may include the first delay 1 corresponding to green light band, the first delay 2 corresponding to blue light band and the first delay 3 corresponding to red light band. The ratio 1' of the first delay 1 to the wavelength of the light in the green light band, the ratio 2' of the first delay 2 to the wavelength of the light in the blue light band, and the ratio 3' of the first delay 3 to the wavelength of the light in the red light band may all be in the preset ratio range. Alternatively, ratios 1', 2' and 3' may be equal and within the preset ratio range.

In addition, the ratio of the wavelength of the light under the preset band to a corresponding first delay may be a preset target constant value, such as a quarter etc.

The negative distribution liquid crystal may be a reactive Mesogen (RM) with negative distribution. A light alignment molecule may be mixed into RM to simplify alignment process and improve the production efficiency. For example, substrates such as flexible ultra-thin substrates may be coated with a mixture of RM and alignment molecules, and curing is performed using polarized UV light to achieve alignment and fabrication of the liquid crystal layer.

Figure 3:
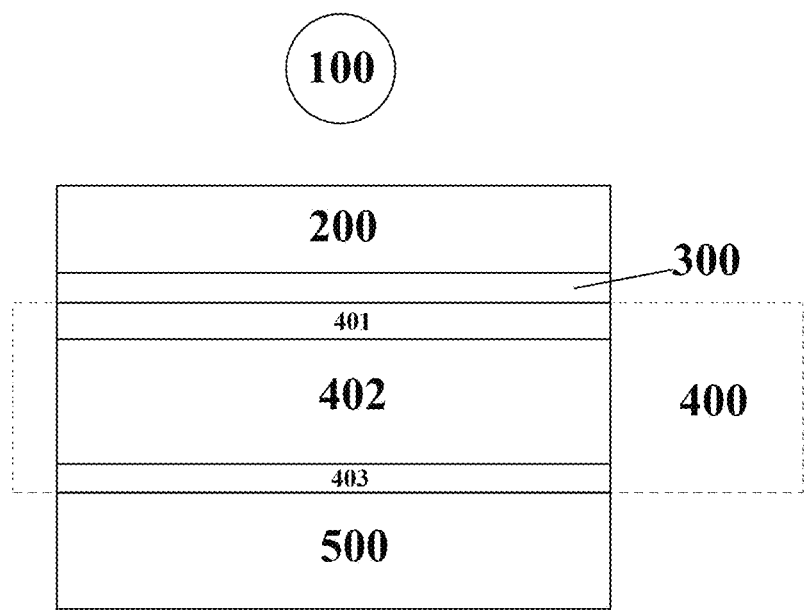
FIG. 3 is a third structural schematic diagram of the phase delay device provided by an embodiment of the specification.

As shown in FIG. 3, the phase delay device may further include a refractive film layer 500, which may be adjacent to the third subpart 403 of the liquid crystal layer 400. The delay of the refractive film layer 500 may be determined based on the target delay of the liquid crystal layer 400. The refractive film layer 500 may be configured to adjust the viewing angle corresponding to the circular polarization light, for example, the delay of the refractive film layer 500 may be the same as the absolute value of the target delay of the liquid crystal layer 400, and the plus-minus sign is opposite.

The refractive index of the refractive film layer 500 satisfies $N_Z > N_X = N_Y$, $N_X$ is a refractive index of the refractive film layer 500 in a lagging phase axis direction, $N_Y$ is a refractive index of the refractive film layer 500 in a leading phase axis direction, $N_Z$ is a refractive index of the refractive film layer 500 in a thickness direction. For example, the refractive film layer 500 may be Posi-C layer. Moreover, the refractive film layer 500 may use a stretched film or a liquid crystal film. Where, the stretched film may use polycarbonate board (PC) material.

The thickness of the liquid crystal layer 400 may be determined based on the birefringence and the target delay of the liquid crystal layer at a preset band. For example, the thickness of the liquid crystal layer 400 may be a ratio of the target delay of the liquid crystal layer 400, to a birefringence difference (that is, a birefringence difference between the fast axis and slow axis of negative distribution liquid crystals) of the negative distribution liquid crystals contained in the liquid crystal layer 400. Where, the thickness of the liquid crystal layer 400 may be varied according to the change of birefringence difference between the fast axis and the slow axis of the negative distribution liquid crystals.

Figure 4:
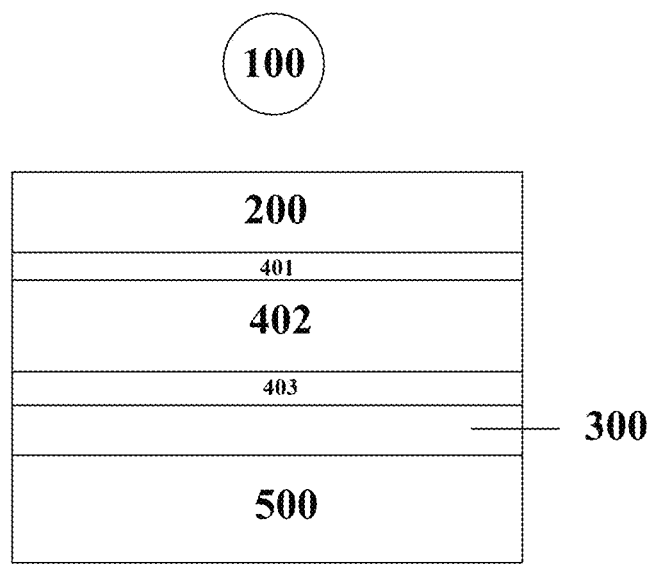
FIG. 4 is a fourth structural schematic diagram of the phase delay device provided by an embodiment of the specification.

In addition, since assembly process of the phase delay device may be different, the third subpart 403 of the liquid crystal layer 400 may be aligned through an angle at the bottom, and the first subpart 401 of the liquid crystal layer 400 may be aligned through an angle at the top. That is, in the phase delay device, the alignment layer 300 may be, as shown in FIG. 1, located between the linear polarization layer 200 and the liquid crystal layer 400, or located between the third subpart 403 of the liquid crystal layer 400 and the refractive film layer 500, as shown in FIG. 4. When the alignment layer 300 is located between the third subpart 403 of the liquid crystal layer and the refractive film layer 500, the third subpart 403 of the liquid crystal may be aligned using the liquid crystal alignment angle based on the preset alignment angle and the spiral angle, so that the liquid crystal of the first subpart 401 may meet the preset alignment angle through the spiral angle of the second subpart 402.

For example, the preset alignment angle of the first subpart 401 may be 20°, the preset spiral angle of the second subpart 402 is 23°, and the liquid crystal alignment angle of the third subpart 403 may be 43°. When the phase delay device is the structure as shown in FIG. 1 (that is, the alignment layer 300 is located between the linear polarization layer 200 and the liquid crystal layer 400), the alignment layer 300 may align the first subpart 401 of the liquid crystal layer 400 based on 20°. When the phase delay device is the structure as shown in FIG. 4 (that is, the alignment layer 300 is located between the third subpart 403 of the liquid crystal layer 400 and the refractive film layer 500), the alignment layer 300 may align the third subpart 403 of the liquid crystal layer 400 based on 43°. The preset spiral angle of the second subpart 402 is 23°, and the liquid crystal alignment angle of the first subpart 401 of the liquid crystal layer 400 is 20 degree.

The liquid crystal layer 400 may be fabricated on a removable substrate, or on a preset substrate and assembled directly into the product. The liquid crystal layer 400 may be fabricated on a cover plate together with the linear polarization layer 200. The preset substrate may include the Tricarboxylic (TAC), Polymethylmethacrylate (PMMA), COP, etc.

As the target delay of the liquid crystal layer 400 is determined based on the preset alignment angle of the first subpart 401 of liquid crystal layer 400, the spiral angle of the second subpart 402, and the wavelength of the light under the preset band, therefore, under the preset band, the ratio of the target delay of the liquid crystal layer 400 to the wavelength of the light, may reach the preset target constant value (e.g., a quarter). That is, under the function of liquid crystal layer 400, the wide-band effect of the phase delay device can be guaranteed, i.e., the wide-band effect can be realized through a single alignment operation, and the preparation efficiency and benign rate of the phase delay device can be improved. In addition, due to a small phase difference in the thickness direction of the liquid crystal layer 400, a degradation of the phase delay device containing the liquid crystal layer 400 in a side view angle is less than that of the phase delay device containing the double-layer wave plate. Therefore, the phase delay device provided in the embodiment of the disclosure has a better performance in terms of the contrast of the side view angle.

Meanwhile, the natural light after emitted by the light source 100, may be converted into linear polarization light via the linear polarization layer 200, and the linear polarization light may be converted into circular polarization light under the function of the liquid crystal layer 400. Finally, the viewing angle corresponding to the circular polarization light may be adjusted through the refractive film layer 500 to further achieve the effect of wide viewing angle.

Embodiments of the disclosure provides a phase delay device. The phase delay device includes a linear polarization layer, an alignment layer and a liquid crystal layer; the linear polarization layer being located at a side of a light source, and configured to convert a received light to a linear polarization light; the alignment layer being located at a side of the linear polarization layer away from the light source, and configured to align liquid crystals of a first subpart of the liquid crystal layer based on a preset alignment angle; the liquid crystal layer being located at a side of the alignment layer away from the linear polarization layer, the liquid crystal layer including a first subpart, a second subpart and a third subpart, the first subpart being adjacent to the alignment layer, and the second subpart being a spiral structure with a preset spiral angle, a liquid crystal alignment angle of the third subpart being determined based on the preset alignment angle and the preset spiral angle, the liquid crystal layer being configured to convert the linear polarization light into circular polarization light through the spiral structure of the second subpart; the liquid crystal layer being a liquid crystal layer including negative distribution liquid crystals, and birefringence of the liquid crystal layer not decreasing with an increase of visible light wavelength; the spiral angle of the second subpart and a target delay of the liquid crystal layer being determined based on the alignment angle for the first subpart and a wavelength of light at a preset band. In such manners, performances of the phase delay device under the preset band can be improved under the action of the preset alignment angle of the first subpart of the liquid crystal layer, the spiral angle of the second subpart and the target delay of the liquid crystal layer, such that the phase delay device operates well under the wide band. Meanwhile, by means of a single alignment of the first subpart of the liquid crystal layer, the linear polarization light can be converted to circular polarization light via the spiral structure of the second subpart of the liquid crystal layer, which reduces the number of alignment operations. That is to say, the problem of low preparation efficiency caused by multiple alignments can be avoided, and the benign rate of the device can also be improved.

Embodiment Three

The embodiments of the disclosure provides a display equipment which may include at least one phase delay device as described in embodiment one and embodiment one. Where:

A linear polarization layer 200 is located at a side of a light source 100, and is configured for converting the received light into linear polarization light.

The alignment layer 300 is located at a side of the linear polarization layer 200 which is away from the light source 100, and is configured to align the liquid crystal of the first subpart 401 of the liquid crystal layer 400 based on the preset alignment angle.

The liquid crystal layer 400 is located at a side of the alignment layer 300 away from the linear polarization layer, the liquid crystal layer 400 includes a first subpart 401, a second subpart 402 and a third subpart 403. The first subpart 401 is adjacent to the alignment layer 300, and the second subpart 402 has a spiral structure with a preset spiral angle, a liquid crystal alignment angle of the third subpart 403 is determined based on the preset alignment angle and the preset spiral angle. The liquid crystal layer 400 is configured to convert the linear polarization light into circular polarization light through the spiral structure of the second subpart 402. The liquid crystal layer 400 is a liquid crystal layer including negative distribution liquid crystals, and birefringence of the liquid crystal layer 400 does not decrease with an increase of visible light wavelength. The spiral angle of the second subpart 402 and a target delay of the liquid crystal layer 400 are determined based on the alignment angle for the first subpart 401 and a wavelength of light at a preset band.

The display equipment may include glass cover plates, the phase delay device, a touch panel layer, a display layer (e.g. OLED display layer), and a protective layer (e.g. backside protective layer), which are arranged adjacently in turn.

Figure 5:
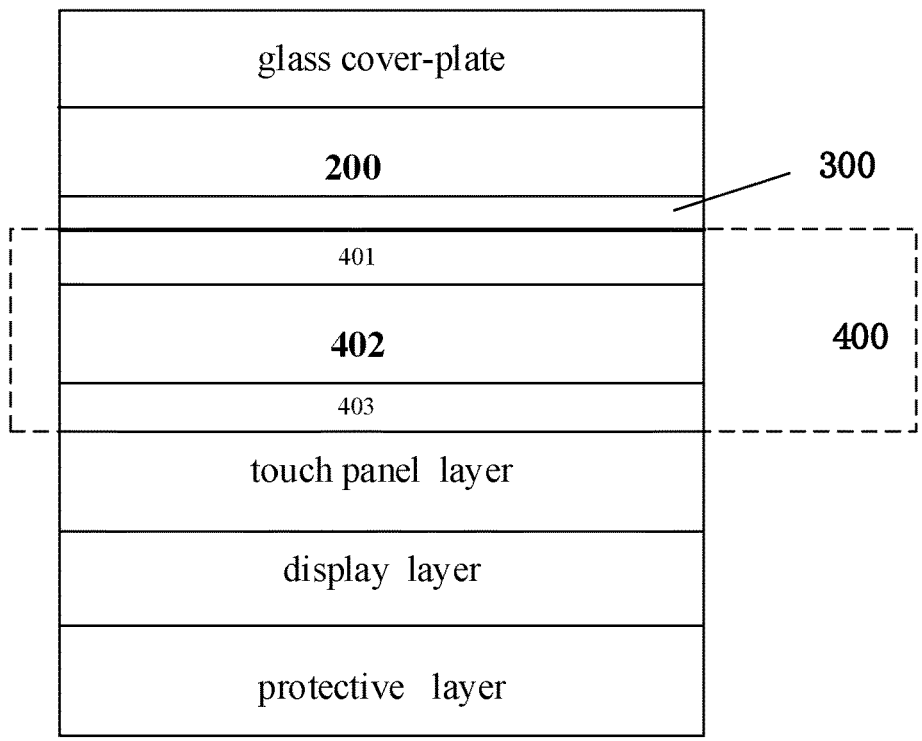
FIG. 5 (*a*) a first structural schematic diagram of the display equipment provided by an embodiment of the specification.
Figure 5:
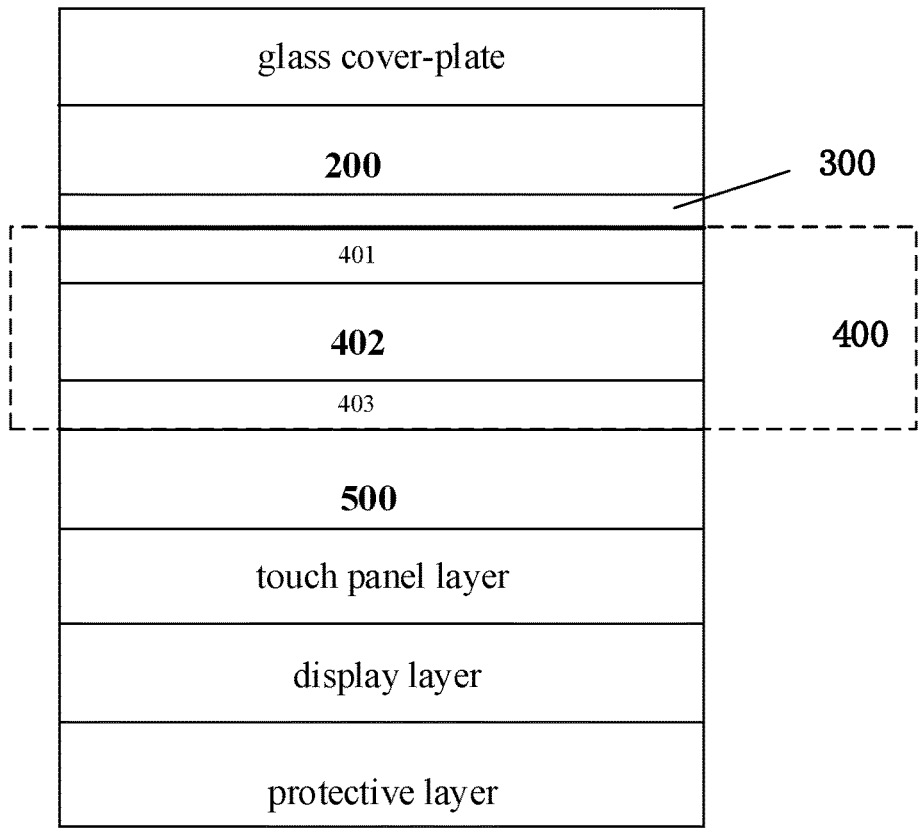

Where, the glass cover may be adjacent to the linear polarization layer 200 of the phase delay device. As shown in FIG. 5 (a), when the phase delay device does not include refractive film layer 500 (that is, the phase delay device as shown in embodiment one), the touch panel layer is adjacent to the third subpart 403 of the liquid crystal layer 400 of the phase delay device. Alternatively, as shown in FIG. 5 (b), when the phase delay device includes refractive film layer 500 (i.e., the phase delay device shown in embodiment two), the touch panel layer may be adjacent to the refractive film layer 500 of the phase delay device.

Embodiments of the disclosure provides a display equipment including the phase delay device. The phase delay device includes a linear polarization layer, an alignment layer and a liquid crystal layer; the linear polarization layer being located at a side of a light source, and configured to convert a received light to a linear polarization light; the alignment layer being located at a side of the linear polarization layer away from the light source, and configured to align liquid crystals of a first subpart of the liquid crystal layer based on a preset alignment angle; the liquid crystal layer being located at a side of the alignment layer away from the linear polarization layer, the liquid crystal layer including a first subpart, a second subpart and a third subpart, the first subpart being adjacent to the alignment layer, and the second subpart being a spiral structure with a preset spiral angle, a liquid crystal alignment angle of the third subpart being determined based on the preset alignment angle and the preset spiral angle, the liquid crystal layer being configured to convert the linear polarization light into circular polarization light through the spiral structure of the second subpart; the liquid crystal layer being a liquid crystal layer including negative distribution liquid crystals, and birefringence of the liquid crystal layer not decreasing with an increase of visible light wavelength; the spiral angle of the second subpart and a target delay of the liquid crystal layer being determined based on the alignment angle for the first subpart and a wavelength of light at a preset band. In such manners, performances of the phase delay device under the preset band can be improved under the action of the preset alignment angle of the first subpart of the liquid crystal layer, the spiral angle of the second subpart and the target delay of the liquid crystal layer, such that the phase delay device operates well under the wide band. Meanwhile, by means of a single alignment of the first subpart of the liquid crystal layer, the linear polarization light can be converted to circular polarization light via the spiral structure of the second subpart of the liquid crystal layer, which reduces the number of alignment operations. That is to say, the problem of low preparation efficiency caused by multiple alignments can be avoided, and the benign rate of the device can also be improved.

Embodiment Four

Figure 6:
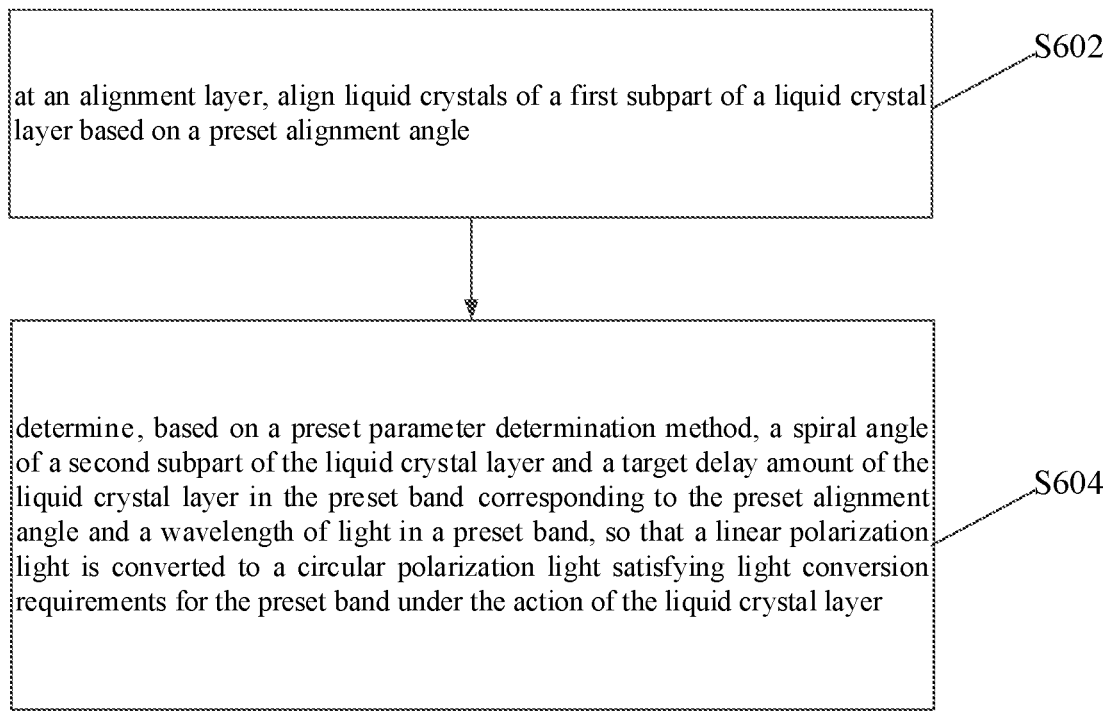
FIG. 6 is a first flow schematic diagram of the phase delay device provided by an embodiment of the specification.

The above are the phase delay device provided in embodiments of the disclosure, and embodiments of the disclosure further provide a preparation method of the phase delay device based on the function and the structure of the phase delay device. The execution subject of the method may be an electronic device, the electronic device may be used for the preparation of the phase delay device, as described in the above embodiment one and embodiment two. As shown in FIG. 6, the method may specifically include the following steps.

In S602, at the alignment layer, liquid crystals of the first subpart of the liquid crystal layer are aligned based on the preset alignment angle.

In S604, it is determined, based on a preset parameter determination method, a spiral angle of a second subpart of the liquid crystal layer and a target delay of the liquid crystal layer in the preset band corresponding to the preset alignment angle and a wavelength of light in a preset band, so that a linear polarization light is converted to a circular polarization light satisfying light conversion requirements for the preset band under the action of the liquid crystal layer.

In an implementation, a preset machine learning algorithm is trained based on a history alignment angle, the wavelength of the light in the history preset band, a history spiral angle and a history target delay, to obtain a trained parameter determination algorithm. Then the spiral angle of the second subpart and the target delay are determined through the trained parameter determination algorithm, the preset alignment angle of the first subpart and the wavelength of the light in the preset band.

The above preset parameter determination method is an optional and realizable parameter determination method. In actual application scenarios, there are a variety of different parameter determination methods, which may be different according to the change of the actual application scenarios, and are not limited in the embodiments of the disclosure.

The embodiment of the disclosure provides a preparation method of a phase delay device. The phase delay device includes a linear polarization layer, an alignment layer and a liquid crystal layer; the linear polarization layer being located at a side of a light source, and configured to convert a received light to a linear polarization light; the alignment layer being located at a side of the linear polarization layer away from the light source, and configured to align liquid crystals of a first subpart of the liquid crystal layer based on a preset alignment angle; the liquid crystal layer being located at a side of the alignment layer away from the linear polarization layer, the liquid crystal layer including a first subpart, a second subpart and a third subpart, the first subpart being adjacent to the alignment layer, and the second subpart being a spiral structure with a preset spiral angle, a liquid crystal alignment angle of the third subpart being determined based on the preset alignment angle and the preset spiral angle, the liquid crystal layer being configured to convert the linear polarization light into circular polarization light through the spiral structure of the second subpart; the liquid crystal layer being a liquid crystal layer including negative distribution liquid crystals, and birefringence of the liquid crystal layer not decreasing with an increase of visible light wavelength; the spiral angle of the second subpart and a target delay of the liquid crystal layer being determined based on the alignment angle for the first subpart and a wavelength of light at a preset band. In such manners, performances of the phase delay device under the preset band can be improved under the action of the preset alignment angle of the first subpart of the liquid crystal layer, the spiral angle of the second subpart and the target delay of the liquid crystal layer, such that the phase delay device operates well under the wide band. Meanwhile, by means of a single alignment of the first subpart of the liquid crystal layer, the linear polarization light can be converted to circular polarization light via the spiral structure of the second subpart of the liquid crystal layer, which reduces the number of alignment operations. That is to say, the problem of low preparation efficiency caused by multiple alignments can be avoided, and the benign rate of the device can also be improved.

Embodiment Five

Figure 7:
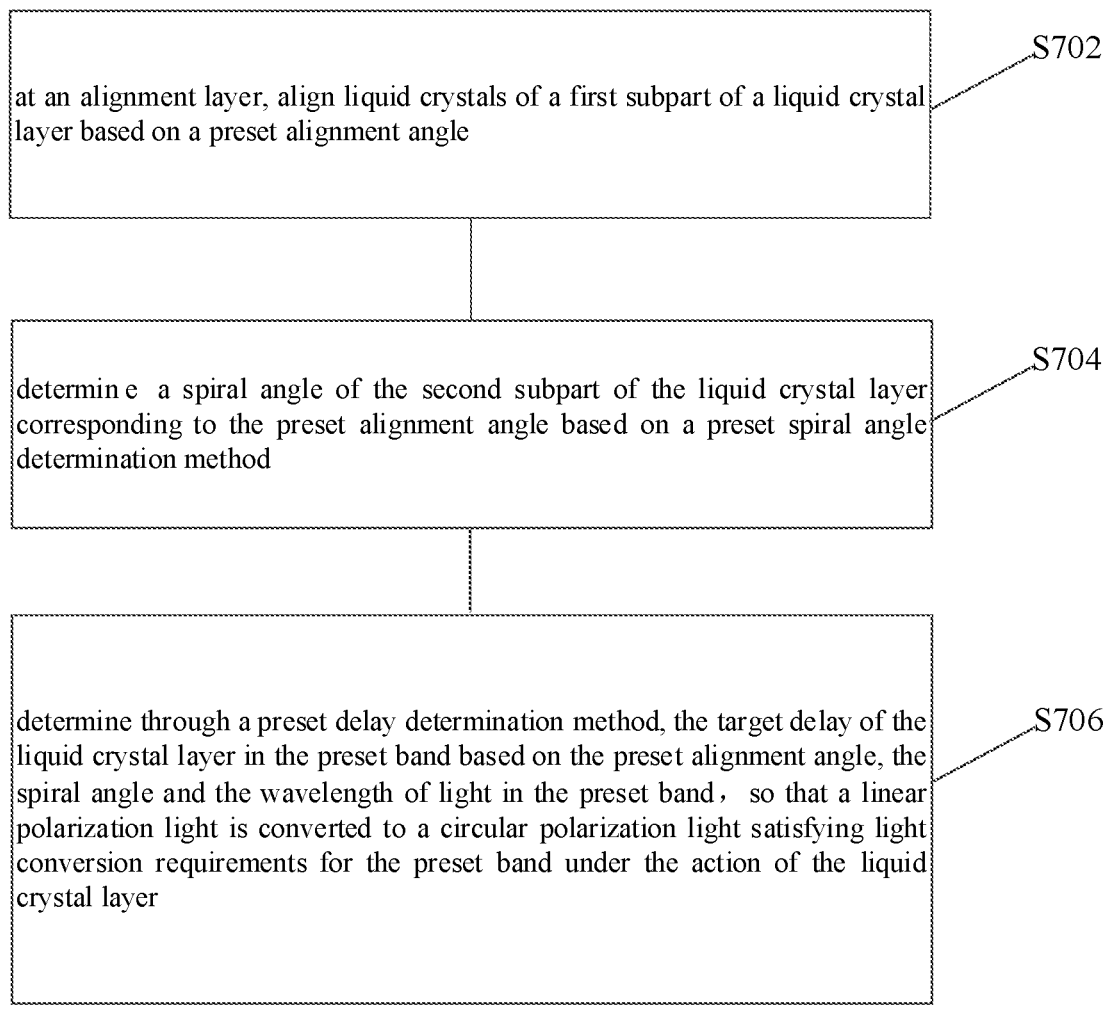
FIG. 7 is a second flow schematic diagram of the phase delay device provided by an embodiment of the specification.

The above are the phase delay device provided in embodiments of the disclosure, and embodiments of the disclosure further provide a preparation method of the phase delay device based on the function and the structure of the phase delay device. The execution subject of the method may be an electronic device, the electronic device may be used for the preparation of the phase delay device, as described in the above embodiment one and embodiment two. As shown in FIG. 7, the method may specifically include the following steps.

In S702, at the alignment layer, liquid crystals of the first subpart of the liquid crystal layer are aligned based on the preset alignment angle.

In S704, the spiral angle of the second subpart of the liquid crystal layer corresponding to the preset alignment angle is determined based on the preset spiral angle determination method.

In an implementation, a preset machine learning algorithm is trained based on a history alignment angle, a history spiral angle and preset light conversion requirements (such as performance requirements of the phase delay device under the preset band etc.), to obtain a corresponding spiral angle determination algorithm. Then, the spiral angle of the second subpart is determined based on the obtained spiral angle determination algorithm, the alignment angle of the first subpart and the preset light conversion requirements.

Alternatively, a preset correspondence between the alignment angle and the spiral angle may be determined based on the history alignment angle and the history spiral angle. Then, the spiral angle of the second subpart of the liquid crystal layer corresponding to the preset alignment angle may be determined based on the preset correspondence between the alignment angle and the spiral angle.

Herein, there are various methods to determine the preset correspondence between the alignment angle and the spiral angle, which may be different according to the change of the actual application scenarios, and are not limited in the embodiments of the disclosure.

In S706, the target delay of the liquid crystal layer under the preset band is determined through the preset delay determination method based on the preset alignment angle, the spiral angle and the wavelength of the light under the preset band.

In the implementation, the light conversion requirements of the phase delay device may be obtained, that is, the wavelength of the light under the preset band may be obtained. For example, if the light conversion requirements of the phase delay device are good viewing angle performance under the green light band and blue light band, the wavelength of the light under the green light band and the wavelength of the light under the blue light band may be obtained.

After obtaining the wavelength of the light in the preset band, the target delay of the liquid crystal layer in the preset band may be determined through the preset delay determination method based on the preset alignment angle, the spiral angle and the wavelength of the light in the preset band.

Herein, there are many preset delay determination methods. For example, a preset machine learning algorithm is trained based on the history preset alignment angle, the history spiral angle, and the wavelengths of the light under the preset band, to obtain the delay determination algorithm, etc. The preset delay determination methods may vary according to the change of different actual application scenarios, and are not limited in the embodiments of the disclosure.

In addition, the preset band may contain multiple different visible light bands (for example, the preset band may contain any number of visible light bands among blue light band, green light band and red light band), and the target delay may contain the first delay corresponding to respective preset band.

As the light has different wavelengths in different preset bands, in order to make the phase delay device have good viewing angle performance in each preset band, it is necessary to make the ratio of the first delay of the liquid crystal layer to the wavelength of a corresponding light reach the preset target constant value or in the preset ratio range even the phase delay device is under different preset bands.

Therefore, the wavelength of light in each preset band may be obtained. The first delay of the liquid crystal layer in each preset band may be determined through the preset delay determination method based on the preset alignment angle, the spiral angle and the wavelength of light in each preset band, so that the phase delay device has good viewing angle performance in the preset band.

The embodiment of the disclosure provides a preparation method of a phase delay device. The phase delay device includes a linear polarization layer, an alignment layer and a liquid crystal layer; the linear polarization layer being located at a side of a light source, and configured to convert a received light to a linear polarization light; the alignment layer being located at a side of the linear polarization layer away from the light source, and configured to align liquid crystals of a first subpart of the liquid crystal layer based on a preset alignment angle; the liquid crystal layer being located at a side of the alignment layer away from the linear polarization layer, the liquid crystal layer including a first subpart, a second subpart and a third subpart, the first subpart being adjacent to the alignment layer, and the second subpart being a spiral structure with a preset spiral angle, a liquid crystal alignment angle of the third subpart being determined based on the preset alignment angle and the preset spiral angle, the liquid crystal layer being configured to convert the linear polarization light into circular polarization light through the spiral structure of the second subpart; the liquid crystal layer being a liquid crystal layer including negative distribution liquid crystals, and birefringence of the liquid crystal layer not decreasing with an increase of visible light wavelength; the spiral angle of the second subpart and a target delay of the liquid crystal layer being determined based on the alignment angle for the first subpart and a wavelength of light at a preset band. In such manners, performances of the phase delay device under the preset band can be improved under the action of the preset alignment angle of the first subpart of the liquid crystal layer, the spiral angle of the second subpart and the target delay of the liquid crystal layer, such that the phase delay device operates well under the wide band. Meanwhile, by means of a single alignment of the first subpart of the liquid crystal layer, the linear polarization light can be converted to circular polarization light via the spiral structure of the second subpart of the liquid crystal layer, which reduces the number of alignment operations. That is to say, the problem of low preparation efficiency caused by multiple alignments can be avoided, and the benign rate of the device can also be improved.

Embodiment Six

Figure 8:
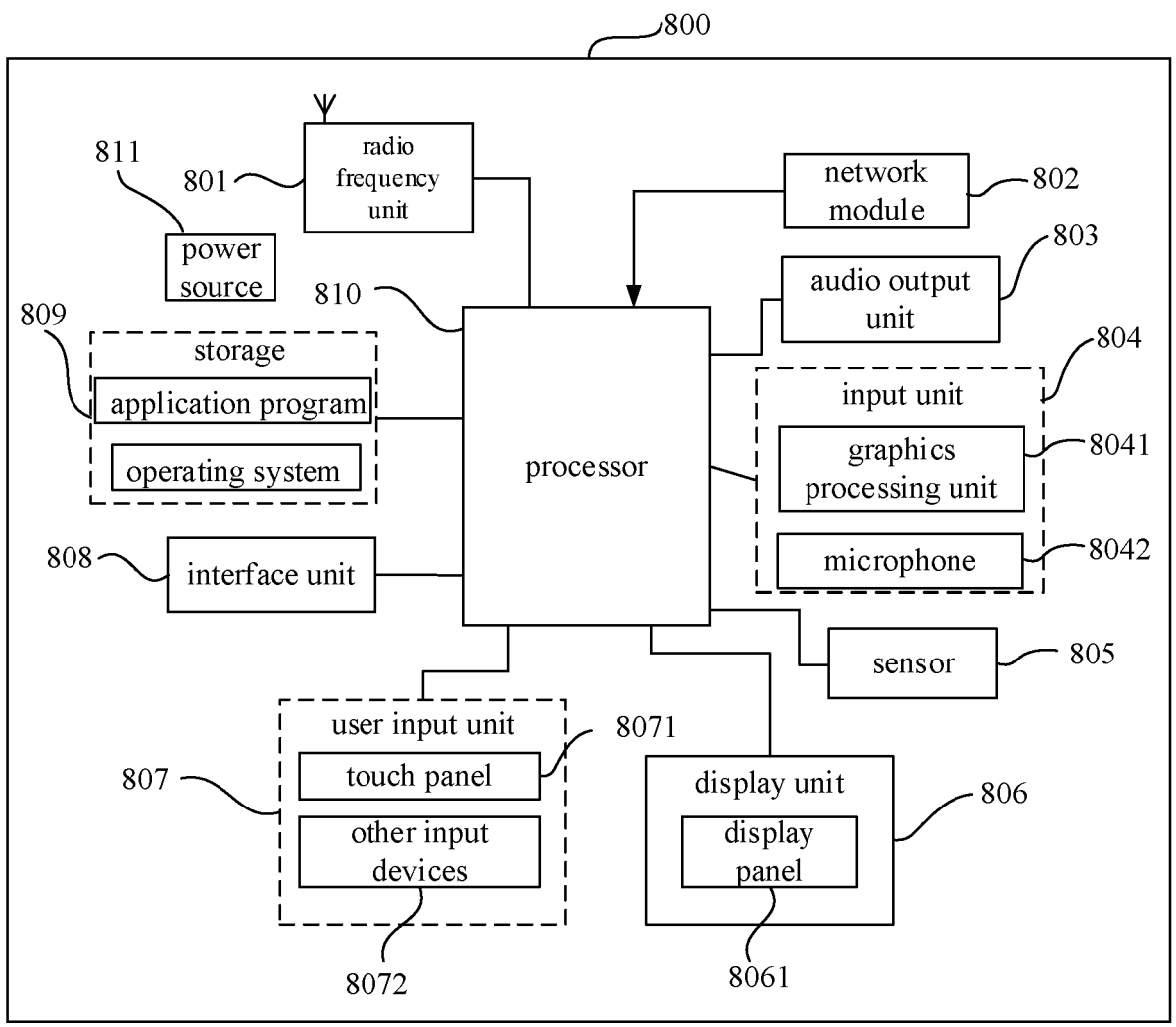
FIG. 8 is a structural schematic diagram of an electronic device of the present disclosure.

FIG. 8 is a hardware structure diagram of an electronic device implementing embodiment four and embodiment five of the present disclosure.

The electronic device 800 includes but not limited to: a radio frequency unit 801, a network module 802, an audio output unit 803, an input unit 804, a sensor 805, a display unit 806, an user input unit 807, an interface unit 808, a storage 809, a processor 810, and a power supply 811 etc. Those skilled in the art may understand that the structure of the electronic device shown in FIG. 8 does not constitute a limitation on the electronic device, and the electronic device may include more or fewer components than shown in the figure, or combine some components, or has different component arrangements. In the embodiment of the disclosure, electronic devices include but not limited to mobile phones, tablet computers, notebook computers, handheld computers, on-board terminals, wearable devices, pedometers, etc.

The processor 810 is configured for: aligning at an alignment layer, liquid crystals of a first subpart of a liquid crystal layer based on a preset alignment angle; determining, based on a preset parameter determination method, a spiral angle of a second subpart of the liquid crystal layer and a target delay of the liquid crystal layer in the preset band corresponding to the preset alignment angle and a wavelength of light in a preset band, so that a linear polarization light is converted to a circular polarization light satisfying light conversion requirements for the preset band under the action of the liquid crystal layer.

In addition, the processor 810 is further configured for: determining a spiral angle of the second subpart of the liquid crystal layer corresponding to the preset alignment angle based on a preset spiral angle determination method; determining through a preset delay determination method, the target delay of the liquid crystal layer in the preset band based on the preset alignment angle, the spiral angle and the wavelength of light in the preset band.

The embodiment of the disclosure provides an electronic device for preparing a phase delay device. The phase delay device includes a linear polarization layer, an alignment layer and a liquid crystal layer, the linear polarization layer being located at a side of a light source, and configured to convert a received light to a linear polarization light, and the alignment layer being located at a side of the linear polarization layer away from the light source and configured to align the liquid crystals of a first subpart of the liquid crystal layer based on a preset alignment angle; the liquid crystal layer being located at a side of the alignment layer away from the linear polarization layer, the liquid crystal layer including a first subpart, a second subpart and a third subpart, the first subpart being adjacent to the alignment layer, the second subpart being a spiral structure with a preset spiral angle, a liquid crystal alignment angle of the third subpart being determined based on the preset alignment angle and the preset spiral angle, the liquid crystal layer being configured to convert the linear polarization light into circular polarization light through the spiral structure of the second subpart, the liquid crystal layer being a liquid crystal layer including negative distribution liquid crystal, and birefringence of the liquid crystal layer not decreasing with an increase of visible light wavelength, the spiral angle of the second subpart and a target delay of the liquid crystal layer being determined based on the alignment angle for the first subpart and a wavelength of light at a preset band. In such manners, performances of the phase delay device under the preset band can be improved under the action of the preset alignment angle of the first subpart of the liquid crystal layer, the spiral angle of the second subpart and the target delay of the liquid crystal layer, such that the phase delay device operates well under the wide band. Meanwhile, by means of a single alignment of the first subpart of the liquid crystal layer, the linear polarization light can be converted to circular polarization light via the spiral structure of the second subpart of the liquid crystal layer, which reduces the number of alignment operations. That is to say, the problem of low preparation efficiency caused by multiple alignments can be avoided, and the benign rate of the device can also be improved.

It should be understood that in the embodiment of the disclosure, the radio frequency unit 801 may be used for receiving and transmitting information, or signals in the process of calling. Specifically, the radio frequency unit 801 can receive downlink data from the base station, and sent the data to the processor 810 for processing; moreover, the radio frequency unit 801 can send the uplink data to the base station. Generally, the radio frequency unit 801 includes, but is not limited to, an antenna, at least an amplifier, a transceiver, a coupler, a low noise amplifier, a duplexer, etc. In addition, the radio frequency unit 801 can also communicate with networks and other devices through a wireless communication system.

The electronic device provides users with wireless broadband Internet access through the network module 802, such as helping users send and receive e-mail, browse web pages and access streaming media.

The audio output unit 803 may convert audio data received by the radio frequency unit 801 or the network module 802 or stored in the storage 809 into an audio signal and output it as sound. Moreover, the audio output unit 803 may further provide audio output related to specific functions performed by the electronic device 800 (such as call signal reception sound, message reception sound, etc.). The audio output unit 803 includes a speaker, a buzzer, a receiver, etc.

The input unit 804 is used to receive the audio or video signal. The input unit 804 may include a graphics processing unit (GPU) 8041 and a microphone 8042. The graphics processing unit 8041 processes the image data of static pictures or video obtained by the image capture device (such as a camera) in the video capture mode or the image capture mode. The processed image frame may be displayed on the display unit 806. The image frame processed by the graphics processor 8041 may be stored in the storage 809 (or other storage medium) or transmitted via the radio frequency unit 801 or the network module 802. The microphone 8042 may receive sound and may process such sound into audio data. The processed audio data may be converted into a output format that can be transmitted to the mobile communication base station via the radio frequency unit 801 in the case of telephone call mode.

The electronic device 800 further includes at least one sensor 805, such as a light sensor, a motion sensor, and other sensors. Specifically, the light sensor includes an ambient light sensor and a proximity sensor. The ambient light sensor can adjust the brightness of the display panel 8061 according to the brightness of the ambient light, and the proximity sensor can turn off the display panel 8061 and/or backlight when the electronic device 800 moves to the ear. As a kind of motion sensor, accelerometer sensor can detect the acceleration in all directions (generally three-axis), and can detect the magnitude and direction of gravity when stationary. The accelerometer sensor can be used to identify the attitude of the electronic device (such as switching between portrait and landscape orientation, related games, magnetometer attitude calibration), vibration recognition related functions (such as pedometer, knocking), etc; the sensor 805 may further include a fingerprint sensor, a pressure sensor, an iris sensor, a molecular sensor, a gyroscope, a barometer, a hygrometer, a thermometer, an infrared sensor, etc., which will not be repeated here.

The display unit 806 is used to display information input by the user or information provided to the user. The display unit 806 may include a display panel 8061, which may be configured in the form of a liquid crystal display (LCD), an organic light emitting diode (OLED), etc.

The user input unit 807 may be used to receive input digital or character information and generate key signal input related to user setting and function control of the electronic device. Specifically, the user input unit 807 includes a touch panel 8071 and other input devices 8072. The touch panel 8071, also known as the touch screen, can collect the user's touch operations on or near it (such as the user's operation on or near the touch panel 8071 using any suitable object or accessory such as finger, stylus, etc.). The touch panel 8071 may include two parts: a touch detection device and a touch controller. The touch detection device detects the user's touch orientation, detects the signal brought by the touch operation, and transmits the signal to the touch controller. The touch controller receives the touch information from the touch detection device, converts it into contact coordinates, which are then sent to the processor 810, and receives the command sent by the processor 810 and executes the command. In addition, the touch panel 8071 can be realized by various types such as resistance, capacitance, infrared and surface acoustic wave. In addition to the touch panel 8071, the user input unit 807 may also include other input devices 8072. Specifically, other input devices 8072 may include but are not limited to physical keyboard, function keys (such as volume control keys, switch keys, etc.), trackball, mouse and joystick, which will not be repeated here.

Furthermore, the touch panel 8071 can cover display panel 8061. When touch panel 8071 detects a touch operation on or near the touch panel 8071, the touch operation is sent to processor 810 to determine the type of touch events. Then the processor 810 provides corresponding visual output on display panel 8061 according to the type of touch events. Although in FIG. 8, the touch panel 8071 and the display panel 8061 are used as two independent components to realize the input and output functions of the electronic device, in some embodiments, touch panel 8071 and display panel 8061 can be integrated to realize the input and output functions of electronic devices, which is not limited herein.

The interface unit 808 is the interface between the external device and the electronic device 800. For example, external devices may include wired or wireless headset ports, external power (or battery charger) ports, wired or wireless data ports, memory card ports, ports for connecting devices with identification modules, audio input/output (I/O) ports, video I/O ports, headset ports, and so on. The interface unit 808 can be used to receive input from an external device (for example, data information, electricity, etc.) and transmit the received input to one or more components within the electronic device 800 or to transmit data between the electronic device 800 and the external device.

Storage 809 can be used to store software programs as well as various kinds of data. Storage 809 can mainly include storage program area and storage data area, where, the storage program area may store the operating system, at least one application required by one function (such as sound playback function, image playback function, etc.). Data storage area can store the data (such as audio data, phone book, etc.) created according to the use of the mobile phone. In addition, storage 809 may include high-speed random-access memory, as well as non-volatile storage, such as at least one disk storage device, flash memory device, or other volatile solid-state storage device.

The processor 810 is the control center of the electronic device. The processor 810 connects the various parts of the electronic device using a variety of interface and the line, performs the functions of the electronic device and processes data through running or executing software program and/or modules stored in the storage 809, as well as calling the data stored in the storage 809, to monitor the electronic equipment in a whole. The processor 810 may include one or more processing units. Preferably, the processor 810 can integrate both the application processor, which mainly deals with operating system, user interface, and applications, and modem processor, which mainly deals with wireless communications. It is understood that the above modem processor may not be integrated into the processor 810.

The electronic device 800 may further include a power supply 811 (such as a battery) that supplies power to various components. Preferably, the power supply 811 may be logically connected to the processor 810 through the power management system to manage charging, discharging, and power consumption.

Optionally, embodiments of the present disclosure further provides an electronic equipment, including the processor 810, the storage 809, and a computer program stored in the memory and executable by the processor 810. when the computer program is executed by the processor 810, the processes of the embodiments of the power supply method mentioned above are realized, and the same technical effect can be achieved. The content will not be described herein, to avoid repetition.

Embodiment Seven

The embodiments of the disclosure further provides a computer readable storage medium in which a computer program is stored. When the computer program is executed by the processor, the various processes of the embodiments of the power supply method mentioned above are realized and the same technical effect can be achieved. In order to avoid repetition, the content is not repeated herein. Where, the computer readable storage medium includes such as read-only memory (ROM), random access memory (RAM), disk or CD, etc.

The embodiments of the disclosure provides a computer readable storage medium, used for the preparation of phase delay device. The phase delay device includes a linear polarization layer, an alignment layer and a liquid crystal layer; the linear polarization layer being located at a side of a light source, and configured to convert a received light to a linear polarization light; the alignment layer being located at a side of the linear polarization layer away from the light source, and configured to align liquid crystals of a first subpart of the liquid crystal layer based on a preset alignment angle; the liquid crystal layer being located at a side of the alignment layer away from the linear polarization layer, the liquid crystal layer including a first subpart, a second subpart and a third subpart, the first subpart being adjacent to the alignment layer, and the second subpart being a spiral structure with a preset spiral angle, a liquid crystal alignment angle of the third subpart being determined based on the preset alignment angle and the preset spiral angle, the liquid crystal layer being configured to convert the linear polarization light into circular polarization light through the spiral structure of the second subpart; the liquid crystal layer being a liquid crystal layer including negative distribution liquid crystals, and birefringence of the liquid crystal layer not decreasing with an increase of visible light wavelength; the spiral angle of the second subpart and a target delay of the liquid crystal layer being determined based on the alignment angle for the first subpart and a wavelength of light at a preset band. In such manners, performances of the phase delay device under the preset band can be improved under the action of the preset alignment angle of the first subpart of the liquid crystal layer, the spiral angle of the second subpart and the target delay of the liquid crystal layer, such that the phase delay device operates well under the wide band. Meanwhile, by means of a single alignment of the first subpart of the liquid crystal layer, the linear polarization light can be converted to circular polarization light via the spiral structure of the second subpart of the liquid crystal layer, which reduces the number of alignment operations. That is to say, the problem of low preparation efficiency caused by multiple alignments can be avoided, and the benign rate of the device can also be improved.

Those skilled in the art should understand that embodiments of the present disclosure may be provided as methods, systems, or computer program products. Therefore, the disclosure may take the form of complete hardware embodiments, complete software embodiments, or embodiments combining software and hardware. Furthermore, the disclosure may take the form of a computer program product implemented on one or more computer usable storage media (including but not limited to disk memory, CD-ROM, optical memory, etc.) in which the computer usable program code is contained.

The present disclosure is described with reference to flow charts and/or block diagrams of methods, equipment (systems), and computer program products according to embodiments of the present disclosure. It should be understood that each process and/or block in the flowchart and/or block diagram and the combination of processes and/or blocks in the flowchart and/or block diagram may be realized by computer program instructions. These computer program instructions may be provided to the processor of general-purpose computer, special-purpose computer, embedded processor or other programmable data processing equipment to create a machine, so that a device for realizing the functions specified in one or more processes of the flowchart and/or one or more blocks of the block diagram is generated by means of the instructions executed by a processor of a computer or other programmable data processing equipment.

These computer program instructions may also be stored in computer readable memory capable of directing the computer or other programmable data processing equipment to operate in a particular manner, which causes the instructions stored in the computer readable memory to produce manufactures including an instruction device. The instruction device implements the functions specified in one flow or more flows in a flowchart and/or one block or more blocks in a block diagram.

These computer program instructions may also be loaded onto a computer or other programmable data processing device to enable a series of steps to be performed on the computer or other programmable device to produce computer-implemented processing. Thus, instructions executed on the computer or other programmable device provide steps for implementing a function specified in one process or more processes in a flowchart and/or one block or more blocks in a block diagram.

In a typical configuration, a computing device includes one or more processor (CPU), an input/output interface, a network interface, and a memory.

Memory may include non-permanent memory, random-access memory (RAM), and/or non-volatile memory in the computer readable medium, such as read-only memory (ROM) or flash RAM. The memory is an example of a computer readable medium.

The computer readable media include permanent and non-permanent, mobile and non-mobile media. Information storage can be realized by any method or technique. Information may be computer-readable instructions, data structures, modules of programs, or other data. Examples of computer storage media include, but not limited to phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, CD-ROM, digital versatile disc (DVD), or other optical storage, magnetic cassette tape, magnetic tape disk storage or other magnetic storage device, or any other non-transmission medium, and the computer storage media may be used to store information accessible by computing devices. As defined herein, the computer readable media do not include transient computer readable media, such as modulated data signals and carrier waves.

It should also be noted that, the term "including" and "include" or any of its other variants is intended to cover a non-exclusive coverage, such that the process, method, product or equipment including a series of elements not only include those elements, but also include other elements not clearly listed, or further include elements inherent to the process, method, product or equipment. Without further restriction, elements defined by the statement "includes a . . . " do not exclude the existence of other identical elements in the process, method, goods or equipment including the elements.

Those skilled in the art shall understand that embodiments of the present disclosure may be provided as methods, systems or computer program products. Therefore, the disclosure may take the form of complete hardware embodiments, complete software embodiments or embodiments combining software and hardware. Furthermore, the disclosure may take the form of a computer program product implemented on one or more computer usable storage media (including but not limited to disk memory, CD-ROM, optical memory, etc.) in which the computer usable program code is included.

The foregoing are only embodiments of the disclosure and are not intended to limit the disclosure. The disclosure is subject to various modifications and variations for those skilled in the art. Any modification, equivalent substitution, improvement etc. made in the spirit and principle of the disclosure shall be included in the scope of claims of the disclosure.

What is claimed is:

1. A phase delay device, comprising a linear polarization layer, an alignment layer and a liquid crystal layer;
the linear polarization layer being located at a side of a light source, and configured to convert a received light to a linear polarization light;
the alignment layer being located at a side of the linear polarization layer away from the light source, and configured to align liquid crystals of a first subpart of the liquid crystal layer based on a preset alignment angle;
the liquid crystal layer being located at a side of the alignment layer away from the linear polarization layer, the liquid crystal layer comprising a first subpart, a second subpart and a third subpart, the first subpart being adjacent to the alignment layer, the second subpart being a spiral structure with a preset spiral angle, and a liquid crystal alignment angle of the third subpart being determined based on the preset alignment angle and the preset spiral angle; the liquid crystal layer being configured to convert the linear polarization light into circular polarization light through the spiral structure of the second subpart; the liquid crystal layer being a liquid crystal layer including negative distribution liquid crystals, and birefringence of the liquid crystal layer not decreasing with an increase of visible light wavelength; the spiral angle of the second subpart and a target delay of the liquid crystal layer being determined based on the alignment angle for the first subpart and a wavelength of light at a preset band; a ratio of a wavelength of light in respective visible light band contained in the preset band to a corresponding first delay being in a preset ratio range, and the first delay being a delay corresponding to the visible light band in the target delay.

2. The phase delay device according to claim 1, wherein the negative distribution liquid crystals are reactive polymer liquid crystals with negative distribution.

3. The phase delay device according to claim 1, wherein the phase delay device further comprises a refractive film layer adjacent to the third subpart of the liquid crystal layer, a delay of the refractive film layer is determined based on the target delay of the liquid crystal layer, and the refractive film layer is configured to adjust a viewing angle corresponding to the circular polarization light.

4. The phase delay device according to claim 3, wherein a refractive index of the refractive film layer satisfies $N_Z > N_X = N_Y$, wherein, $N_X$ is a refractive index of the refractive film layer in a lagging phase axis direction, $N_Y$ is a refractive index of the refractive film layer in a leading phase axis direction, $N_Z$ is a refractive index of the refractive film layer in a thickness direction.

5. The phase delay device according to claim 1, wherein a thickness of the liquid crystal layer is determined based on the birefringence and the target delay of the liquid crystal layer in the preset band.

6. A display equipment, wherein the display equipment comprises the phase delay device according to claim 1.

7. A preparation method for a phase delay device, wherein the method is applied to the phase delay device according to claim 1, and the method comprises:

aligning, at an alignment layer, liquid crystals of a first subpart of a liquid crystal layer based on a preset alignment angle;

determining, based on a preset parameter determination method, a spiral angle of a second subpart of the liquid crystal layer and a target delay of the liquid crystal layer in the preset band corresponding to the preset alignment angle and a wavelength of light in a preset band, so that a linear polarization light is converted to a circular polarization light satisfying light conversion requirements for the preset band under the action of the liquid crystal layer; a ratio of a wavelength of light in respective visible light band contained in the preset band to a corresponding first delay being in a preset ratio range, and the first delay being a delay corresponding to the visible light band in the target delay.

8. The method according to claim 7, wherein determining, based on a preset parameter determination method, a spiral angle of a second subpart of the liquid crystal layer and a target delay of the liquid crystal layer in the preset band corresponding to the preset alignment angle and a wavelength of light in a preset band, comprises:

determining a spiral angle of the second subpart of the liquid crystal layer corresponding to the preset alignment angle based on a preset spiral angle determination method;

determining through a preset delay determination method, the target delay of the liquid crystal layer in the preset band based on the preset alignment angle, the spiral angle and the wavelength of light in the preset band.

* * * * *